United States Patent
Vanweelden et al.

(10) Patent No.: US 8,598,736 B2
(45) Date of Patent: *Dec. 3, 2013

(54) INPUT CIRCUIT FOR ALTERNATING CURRENT SIGNAL, AND MOTOR STARTER INCLUDING THE SAME

(71) Applicant: Eaton Corporation, Cleveland, OH (US)

(72) Inventors: Ronald A. Vanweelden, Wauwatosa, WI (US); Mark A. Verheyen, Whitefish Bay, WI (US)

(73) Assignee: Eaton Corporation, Cleveland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/764,276

(22) Filed: Feb. 11, 2013

(65) Prior Publication Data

US 2013/0163141 A1 Jun. 27, 2013

Related U.S. Application Data

(63) Continuation of application No. 12/824,585, filed on Jun. 28, 2010, now Pat. No. 8,373,373.

(51) Int. Cl.
*H02J 3/00* (2006.01)

(52) U.S. Cl.
USPC ............ 307/11; 307/10.6; 307/105; 307/109; 307/112; 333/24 C; 318/400.21; 318/400.22; 318/400.1; 318/794

(58) Field of Classification Search
USPC ............ 307/105, 112, 125, 141, 98, 10.6, 11, 307/109; 318/430, 794, 795, 796, 563, 662, 318/400.1, 400.21, 400.22, 800; 324/754.28; 333/24 C; 455/41.1; 361/29, 93.1

See application file for complete search history.

(56) References Cited

U.S. PATENT DOCUMENTS

| | | | | |
|---|---|---|---|---|
| 4,728,810 | A * | 3/1988 | Engel | 307/108 |
| 5,719,732 | A * | 2/1998 | Nagahama et al. | 361/29 |
| 6,130,488 | A * | 10/2000 | Hansen et al. | 307/125 |
| 7,199,587 | B2 | 4/2007 | Hurwicz | |
| 7,254,004 | B2 * | 8/2007 | Mladenik et al. | 361/93.1 |
| 7,511,979 | B2 | 3/2009 | Newman, Jr. | |
| 2004/0169987 | A1 | 9/2004 | Green | |

* cited by examiner

*Primary Examiner* — Anthony M Paul
(74) *Attorney, Agent, or Firm* — Eckert Seamans Cherin & Mellott, LLC; Kirk D. Houser

(57) ABSTRACT

An input circuit includes an interface structured to output a logic signal from an alternating current signal of a pair of elongated conductors. A load is switchable to the elongated conductors. A processor outputs a control signal to switch the load to the elongated conductors asynchronously with respect to the alternating current signal for a first predetermined time, inputs the logic signal, determines if the input logic signal is active a plurality of times during the first predetermined time and responsively sets a first state of the alternating current signal, and, otherwise, sets an opposite second state of the alternating current signal, and delays for a second predetermined time, which is longer than the first predetermined time, for the opposite second state before repeating the output, and, otherwise, delays for a third predetermined time, which is longer than the second predetermined time, for the first state before repeating the output.

22 Claims, 3 Drawing Sheets

INPUT CIRCUIT FOR ALTERNATING CURRENT SIGNAL, AND MOTOR STARTER INCLUDING THE SAME

CROSS-REFERENCE TO RELATED APPLICATION

This application is a continuation of U.S. patent application Ser. No. 12/824,585, filed Jun. 28, 2010.

BACKGROUND

1. Field

The disclosed concept pertains generally to input circuits and, more particularly, to input circuits for alternating current signals. The disclosed concept also pertains to electrical apparatus, such as motor starters.

2. Background Information

Capacitive coupling occurs when conductors, such as I/O (input/output) lines used to carry signals (e.g., without limitation, signals for motor overloads, such as an input signal to reset a motor after the occurrence of a trip), are in close proximity to other conductors that carry power. These conductors may all be coupled closely together in the same wire tray or even the same cable pack.

FIG. 1 shows a typical configuration including the potential for capacitive coupling. A remote switch S1 2 can be 100 to several 1000 feet away from a motor starter 4. In this example, a 120 VAC hot line 6 is energized at all times. The capacitor C1 8 is not real, but represents the fact that two elongated conductors 10 travel a relatively long distance in a cable pack (not shown), in order that the conductors are physically side by side and therefore act as two plates of a capacitor that are coupled relatively tightly together. The longer the conductors 10 travel together the greater the capacitance. One plate of this capacitor has the 120 VAC voltage applied at all times. The other plate is pulled to ground through resistor R1 12 when switch S1 2 is open. Circuitry (not shown) internal to the motor starter 4 monitors the voltage across R1 12 to determine if a valid input signal is present. This particular example has a threshold set at a predetermined value, such as 5 VDC. Any signal above 5 VDC would be considered to be a single valid logic high and any signal below 5 VDC would be a valid logic low. With switch S1 2 open, the voltage on R1 12 is a function of the magnitude of the capacitance of capacitor C1 8 and the magnitude of the resistance of resistor R1 12. These two components form a high-pass filter whose output voltage, Vout, is given by Equation 1.

$$Vout = 2\pi FREQ(Vin)(C1)(R1)/((2\pi FREQ(C1)(R1))^2 + 1)^{0.5} \quad \text{(Eq. 1)}$$

wherein:
Vin is AC input voltage (e.g., without limitation, 120 VAC); and
FREQ is frequency (e.g., without limitation, 60 Hz) of the AC input voltage.

Plugging in appropriate values gives the results shown in Table 1:

TABLE 1

| C1 (F) | R1 (Ω) | FREQ (Hz) | Vin (VAC$_{RMS}$) | Vout (VAC$_{RMS}$) | Vout Peak (V) | 5 VDC valid logic high |
|---|---|---|---|---|---|---|
| 5.00E−08 | 100000 | 60 | 120 | 106.0 | 149.9 | No |
| 5.00E−09 | 100000 | 60 | 120 | 22.2 | 31.4 | No |
| 5.00E−10 | 100000 | 60 | 120 | 2.3 | 3.2 | Yes |

TABLE 1-continued

| C1 (F) | R1 (Ω) | FREQ (Hz) | Vin (VAC$_{RMS}$) | Vout (VAC$_{RMS}$) | Vout Peak (V) | 5 VDC valid logic high |
|---|---|---|---|---|---|---|
| 5.00E−05 | 100 | 60 | 120 | 106.0 | 149.9 | No |
| 5.00E−06 | 100 | 60 | 120 | 22.2 | 31.4 | No |
| 5.00E−07 | 100 | 60 | 120 | 2.3 | 3.2 | Yes |

If the motor starter input impedance is relatively high (e.g., R1=100 KΩ), then the cabling can only have the capacitance of C1 be about 0.5 nF (5.00E-10 F) before the threshold is exceeded with S1 2 open. The capacitance of C1 8 being greater than 0.5 nF gives an invalid logic high. When the input impedance is changed to 100 Ω, the capacitance of C1 8 being greater than 0.5 μF (5.00E-07 F) gives an invalid logic high. Cabling capacitance can become 1000 times greater before false readings can occur. Larger capacitance handling would allow much longer cable lengths.

Hence, a valid signal on an input line can have capacitive coupling issues due to relatively long distance runs or due to a relatively high voltage in close proximity to the input line.

It is known to employ a synchronous input circuit that turns on a load bank for approximately 4 mS at every zero-crossing. The load bank is turned on 2 mS before each zero-crossing and held on until 2 mS after the zero-crossing. This requires knowing exactly when the zero-crossings occur. The voltage across the load bank is relatively small during this time interval.

There is room for improvement in input apparatus.

There is also room for improvement in electrical apparatus, such as motor starters.

SUMMARY

These needs and others are met by embodiments of the disclosed concept, which output a control signal to switch a load to a pair of elongated conductors asynchronously with respect to an alternating current signal for a first predetermined time, input a logic signal from the alternating current signal of the pair of elongated conductors, determine if the input logic signal is active a plurality of times during the first predetermined time and responsively set a first state of the alternating current signal, and, otherwise, set an opposite second state of the alternating current signal, and delay for a second predetermined time, which is longer than the first predetermined time, for the opposite second state before repeating the output, and, otherwise, delay for a third predetermined time, which is longer than the second predetermined time, for the first state before repeating the output.

In accordance with one aspect of the disclosed concept, an input circuit for an alternating current signal comprises: an interface structured to output a logic signal from the alternating current signal of the pair of elongated conductors; a load switchable to the pair of elongated conductors; and a processor structured to: (i) output a control signal to switch the load to the pair of elongated conductors asynchronously with respect to the alternating current signal for a first predetermined time, (ii) input the logic signal, (iii) determine if the input logic signal is active a plurality of times during the first predetermined time and responsively set a first state of the alternating current signal, and, otherwise, set an opposite second state of the alternating current signal, and (iv) delay for a second predetermined time, which is longer than the first predetermined time, for the opposite second state before repeating the output, and, otherwise, delay for a third predetermined time, which is longer than the second predetermined time, for the first state before repeating the output.

The processor may be structured to determine if the logic signal is active for a plurality of consecutive times during the first predetermined time, responsively set the first state of the alternating current signal, and delay for the third predetermined time, and, otherwise, delay for the second predetermined time.

As another aspect of the disclosed concept, a motor starter comprises: a contactor; and an overload relay comprising: an input for an alternating current signal from a pair of elongated conductors, an interface structured to output a logic signal from the alternating current signal of the pair of elongated conductors, a load switchable to the pair of elongated conductors, and a processor structured to: (i) output a control signal to switch the load to the pair of elongated conductors asynchronously with respect to the alternating current signal for a first predetermined time, (ii) input the logic signal, (iii) determine if the input logic signal is active a plurality of times during the first predetermined time and responsively set a first state of the alternating current signal, and, otherwise, set an opposite second state of the alternating current signal, and (iv) delay for a second predetermined time, which is longer than the first predetermined time, for the opposite second state before repeating the output, and, otherwise, delay for a third predetermined time, which is longer than the second predetermined time, for the first state before repeating the output.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

As employed herein, the term "number" shall mean one or an integer greater than one (i.e., a plurality).

As employed herein, the term "processor" means a programmable analog and/or digital device that can store, retrieve, and process data; a computer; a workstation; a personal computer; a microprocessor; a microcontroller; a microcomputer; a central processing unit; a mainframe computer; a mini-computer; a server; a networked processor; or any suitable processing device or apparatus.

Figure 2:
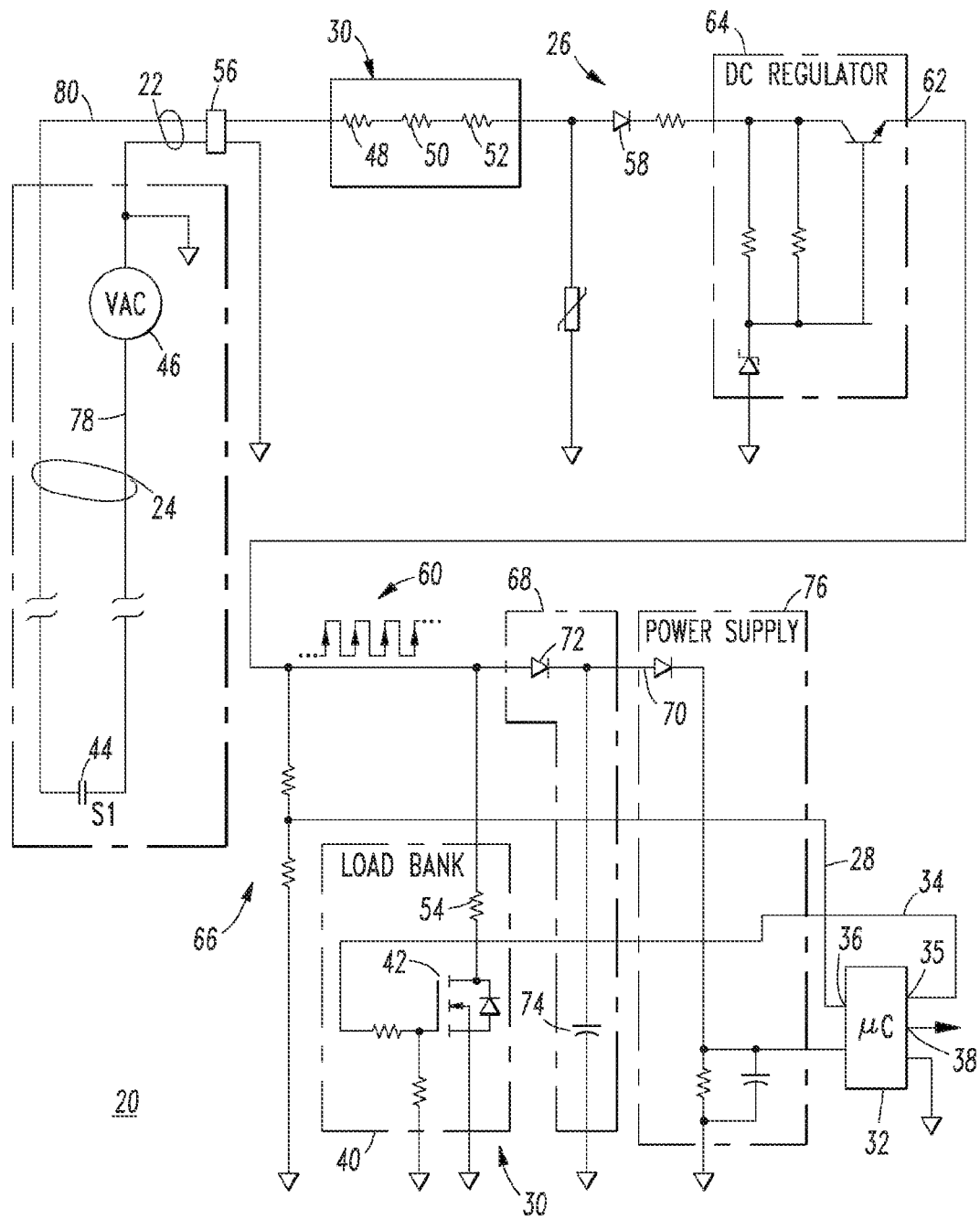
FIG. 2 is a block diagram in schematic form of an input circuit in accordance with embodiments of the disclosed concept.

Referring to FIG. 2, an input circuit 20 is shown for an alternating current signal 22 from a pair of elongated conductors 24. The input circuit 20 includes an interface 26 structured to output a logic signal 28 from the alternating current signal 22, a load 30 switchable to the pair of elongated conductors 24, and a processor, such as the example microcomputer (μC) 32. As will be explained in greater detail, below, in connection with FIG. 4, the μC 32 is structured to output a control signal 34 from output 35 to switch the load 30 to the pair of elongated conductors 24 asynchronously with respect to the alternating current signal 22 for a first predetermined time (e.g., without limitation, about 121 mS; any suitable time), input the logic signal 28 from input, such as input port 36, determine if the input logic signal 28 is active a plurality of times during the first predetermined time and responsively set a first state of the alternating current signal 22 at output, such as output port 38, and, otherwise, set an opposite second state of the alternating current signal 22 at output port 38, and delay for a second predetermined time (e.g., without limitation, about 750 mS; any suitable time), which is longer than the first predetermined time, for the opposite second state before repeating the output of the control signal 34 from the output 35, and, otherwise, delay for a third predetermined time (e.g., without limitation, about 2 S; any suitable time), which is longer than the second predetermined time, for the first state before repeating the output of the control signal 34 from the output 35.

EXAMPLE 1

Figure 1:
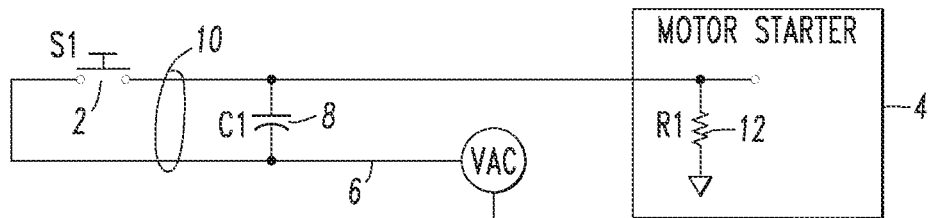
FIG. 1 is a block diagram in schematic form of an input configuration including the potential for capacitive coupling.

As will be further explained in connection with FIG. 4, below, selective electronic loading and rising edge zero-crossing logic is implemented by the example μC 32 to greatly reduce capacitive coupling issues. The μC 32 selectively turns on an electronic load bank 40 using transistor 42 as controlled by control signal 34 from output 35 for a predetermined time (e.g., without limitation, about 121 mS). When a predetermined count (e.g., without limitation, four) of consecutive rising edges of logic signal 28 from input port 36 occur in the example 121 mS, the μ32 detects corresponding consecutive AC cycles if a corresponding remote switch S1 44 is closed. The electronic load bank 40 functions, in part, like resistor R1 12 of FIG. 1. The momentary switch S1 44 and an example 120 VAC voltage of VAC power source 46 are applied to the input circuit 20. This is accomplished by closing the momentary switch S1 44 for a minimum of about the example 121 mS time, which could cover, for example, at least four AC cycles at 50 Hz (about 20 mS per cycle) or 60 Hz (about 16.67 mS per cycle). The VAC power source 46 can be, for example, one of a 50 Hz and a 60 Hz alternating current power source.

Generally, the μC 32 turns on the electronic load bank 40 for the example 121 mS, checks for a predetermined count (e.g., without limitation, four; any suitable count) of valid consecutive rising edges of the logic signal 28, and then turns off the electronic load bank 40 for a predetermined time (e.g., without limitation, 750 mS) to allow it to cool down. The wattage of the example resistors 48,50,52,54 employed by the load 30 is relatively very small, in order that they are turned off relatively frequently to avoid exceeding their wattage rating. It is also desired to check for switch closure of momentary switch S1 44 as often as possible (e.g., without limitation, every 750 mS). However, if the example 120 VAC voltage of the VAC power source 46 goes up to, for instance, 150 VAC, then that could cause the load 30 to overheat. Changing the example 750 mS time to a longer predetermined time (e.g., without limitation, 2000 mS) would allow the load 30 to cool down. However, checking only every, for example, 2000 mS (2 seconds) for momentary switch closure is believed to be too long, since sometimes a button could be pressed and missed.

Of interest, sometimes the alternating current signal 22 signal is not real (i.e., it is capacitively coupled) and sometimes it is real (e.g., resulting from an actual switch closure). Any such capacitively coupled VAC signal pulls instantly below the level needed for a valid logic low when the electronic load bank 40 is turned on for the example 121 mS period, but has no power behind it and, therefore, the load 30 runs sufficiently cool and can be turned back on, for example, 750 mS later. If the VAC signal is real and the example 120 VAC voltage appears across the load resistors 48,50,52,54, then these resistors are heated. Therefore, they are turned off for the example two seconds before the example 121 mS pulse is applied again. In other words, the μC 32 checks for switch closure every, for example, 750 mS if the VAC signal is capacitively coupled (switch open), and every, for example, 2 seconds if the VAC signal is real (switch closed).

EXAMPLE 2

The disclosed concept applies the electronic load bank 40 asynchronously or randomly with respect to the example VAC voltage of the VAC power source 46 for the example 121 mS period in order to check for a real switch closure (therefore, not a capacitively coupled signal) on the relatively long distance conductors 24.

The disclosed concept provides asynchronous operation with a relatively small processing time, and no special zero-crossing circuits to detect AC zero-crossings. Although there is a relatively high voltage on the example load 30, the use of appropriate duty cycles, with the example 750 mS and 2000 mS delays, allows the load 30 to remain relatively cool.

EXAMPLE 3

The example electronic load bank 40 takes the relatively high input impedance of the input port 36 of the μC 32 and turns it into a relatively low input impedance as viewed from the example alternating current signal 22 at input connector 56. The interface 26 includes a half-wave rectifier, such as diode 58, and a linear DC regulator 64 powered by the diode 58 and being structured to output square waves 60 including a positive DC voltage when a positive half of the half-wave rectified alternating current signal 22 is present, and about zero volts when a negative half of the half-wave rectified alternating current signal 22 is present. The example 120 VAC input voltage is half-wave rectified by the diode 58, which naturally produces the square waves 60 (corresponding to AC zero-crossings) at the output 62 of the linear DC regulator 64. The linear DC regulator 64 outputs, for example, 15 VDC when the positive half of the half-wave rectified 120 VAC input voltage is present, but instantly drops to about zero volts on the negative half of the half-wave rectified 120 VAC input voltage. Each of the square waves 60 begins to lose some of its form factor (squareness) as the applied input AC waveform approaches relatively very low levels of magnitude and begins to resemble a half-wave rectified sine wave, but still provides valid logic high and low levels.

For the alternating current signal 22 to be a valid input signal, in this example, four consecutive rising edge zero-crossings (each rising edge zero-crossing is a rising edge of the square waves 60) occurs during the example 121 mS on time of the electronic load bank 40. The electronic load bank off-time reverts to, for example, 750 mS if no valid rising edge zero-crossings occur and to, for example, 2000 mS if four consecutive rising edge zero-crossings occur to prevent overheating of load 30.

The interface 26 further includes a divider circuit 66 structured to divide the square waves 60 and output the logic signal 28. The zero-crossing signal (square waves 60) is appropriately divided down by the divider circuit 66 to give a proper magnitude logic signal 28 directly into the input port 36 of the μC 32, which is preferably structured to detect a rising edge of the signal 28.

The example interface 26 further includes a peak hold circuit 68 powered by the square waves 60 and structured to power μC 32. The peak hold circuit 68 is structured to output a constant DC voltage, such as the example +15 VDC 70, regardless of zero-crossing. The peak hold circuit 68 includes a diode 72 and a capacitor 74 which take voltage from the square waves 60 and transfers that to the power supply circuit 76, but does not let the example +15 VDC 70 decay even though the voltage of the square waves 60 goes away.

Figure 3:
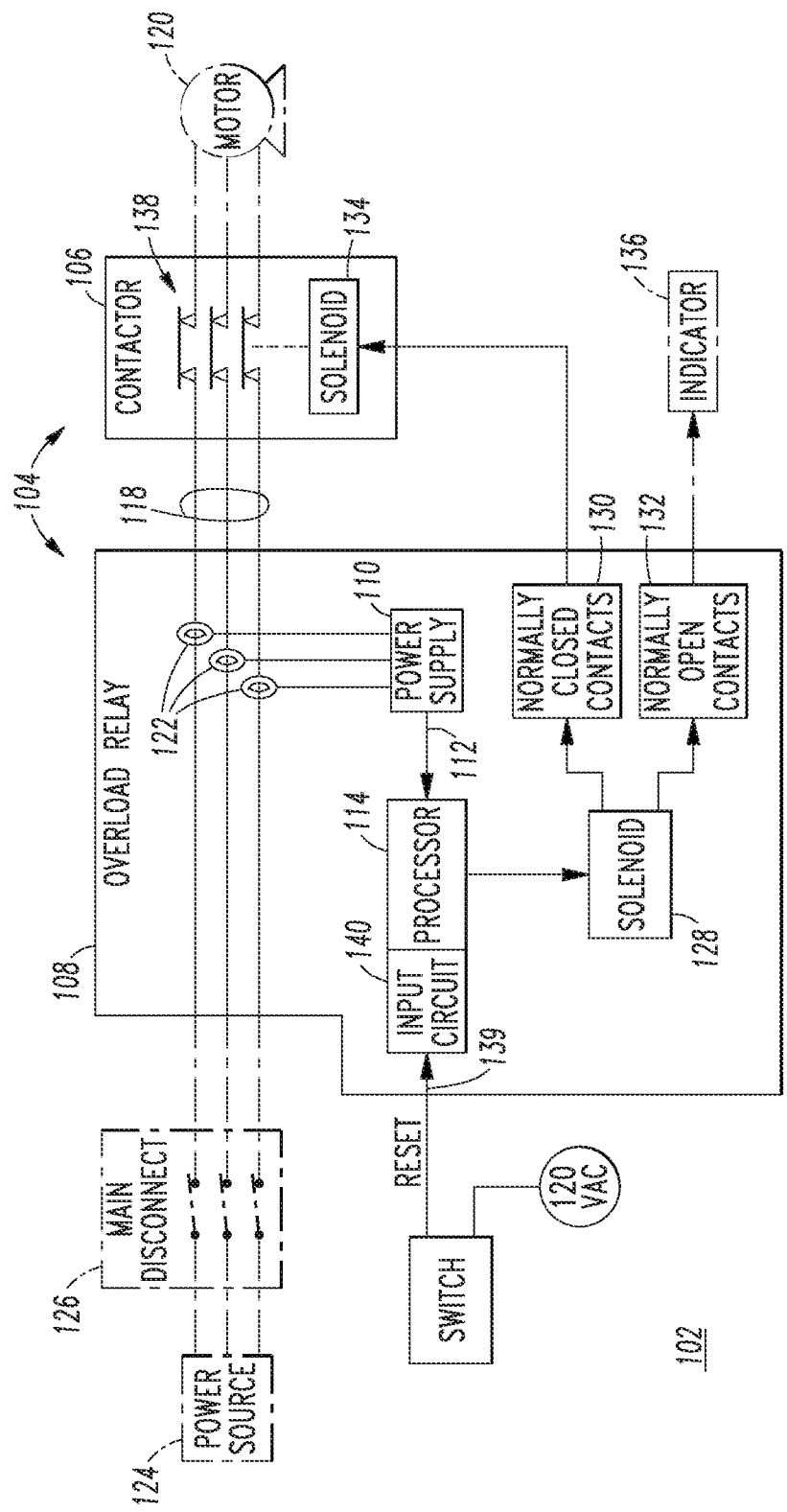
FIG. 3 is a block diagram in schematic form of a motor starter including the input circuit of FIG. 2.

The input circuit 20 of FIG. 2 can include a separate "reset board" (not shown) that includes a connector (not shown) that mates with a corresponding connector (not shown) on, for example, the overload relay 108 of FIG. 3. In this example, the "reset board" does not include the processor 32 of FIG. 2, which can provide the same function as that of the processor 114 of FIG. 3.

EXAMPLE 4

The example 121 mS corresponds to at least four consecutive positive going zero-crossings during at least four consecutive alternating current line cycles of the alternating current signal 22.

EXAMPLE 5

As shown in FIG. 2, one conductor 78 of the elongated conductors 24 is electrically connected to the VAC power source 46 proximate to the interface 26, and the other conductor 80 of the elongated conductors 24 is electrically connected to the interface 26 through input connector 56. The pair of elongated conductors 24 extends for a distance of about 100 feet to about two miles and is remotely electrically connected to the remote switch S1 44. The example input circuit 20 allows input lines to be run such a relatively long distance without being affected by capacitive coupling of voltages on neighboring conductors, such as 78,80, located in same cable pack (not shown).

EXAMPLE 6

Referring to FIG. 3, a motor starter system 102 includes a motor starter 104 formed by a contactor 106 and an overload relay 108. The overload relay 108 includes a power supply 110 having a voltage 112, and a processor 114 powered by the power supply voltage 112 and being structured to control the contactor 106.

The power supply 110 of the overload relay 108 is preferably structured to be parasitically-powered from a number of power lines 118 to a motor 120 (shown in phantom line drawing). In that instance, the overload relay 108 further includes a number of current transformers 122 structured to sense current flowing to the motor 120 and to supply power to the power supply 110. When the current trip level of the overload relay 108 is set relatively very low for motors that take a relatively very low level of current, the power supply 110 may take a relatively long time (e.g., without limitation, 30 minutes to an hour) to get to a predetermined level where the processor 114 is turned on and allowed to perform a trip. Closing switch S1 44 enables power supply 76 (FIG. 2) to be ORed (not shown) with power supply 110, thereby allowing the system to come up immediately and perform a reset as commanded by closure of switch S1 44.

The example motor starter system 102 further includes a power source 124 (shown in phantom line drawing) and a main disconnect 126 (shown in phantom line drawing), which supplies power to the overload relay 108 when motor current flows.

The example processor 114 controls a solenoid 128 that, in turn, controls normally closed contacts 130 and normally open contacts 132. The example normally closed contacts 130 control a solenoid 134 of the contactor 106. The example normally open contacts 132 control an indicator 136 that indicates the status of separable contacts 138 of the contactor 106. The example processor 114 can also input a reset signal 139, which can be the same as or similar to the alternating current signal 22 of FIG. 2, through an input circuit 140, which can be the same as or similar to the input circuit 20 of FIG. 2. In this example, the processor 114 can be the same as or similar to the μC 32 of FIG. 2.

EXAMPLE 7

In this particular example, the example signal 139 is a reset signal, which can cause a reset of the overload relay 108. In other applications it can be, for example and without limitation, any suitable signal, such as a start signal or permission/permissive signal that is run a relatively long distance (e.g., without limitation, hundreds of feet to two miles) and can pickup signals from other nearby conductors (e.g., capacitively coupled).

EXAMPLE 8

Figure 4:
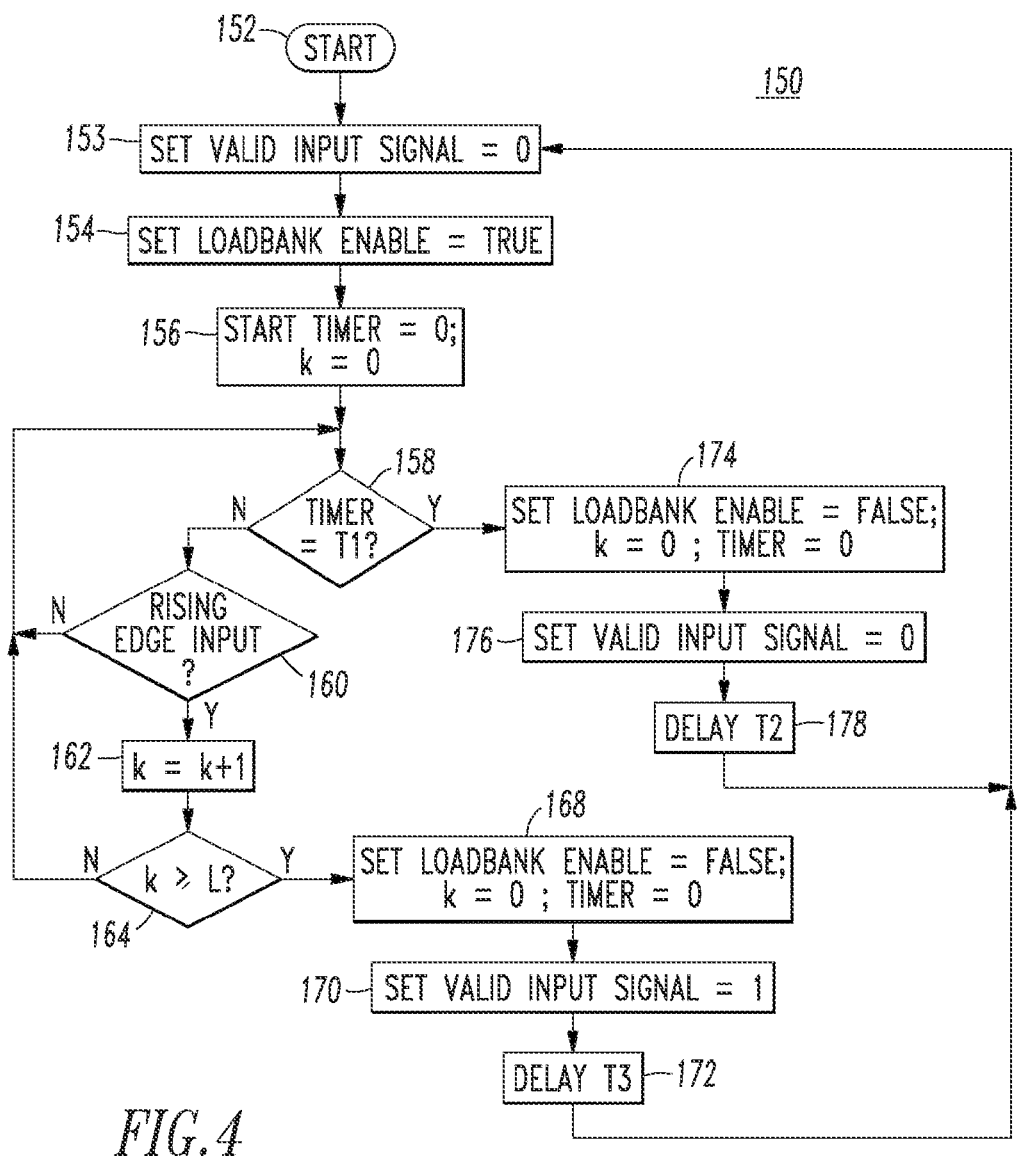
FIG. 4 is a flowchart of a routine employed by the processor of FIG. 2.

FIG. 4 is a flowchart of a routine 150 employed by the μc 32 of FIG. 2. The routine 150 starts, at 152, after which it sets logical VALID INPUT SIGNAL equal to zero, at 153. Next, at 154, the LOADBANK ENABLE signal 34 is set true. Then, at 156, a timer (e.g., part of μC 32) is set to zero, and an integer k is set to zero. Next, at 158, it is determined if the μC timer is at a time period T1 (e.g., without limitation, 121 mS; any suitable time). If not, then, at 160, it is determined if there was a rising edge input from input 36. If not, then step 158 is repeated. Otherwise, at 162, integer k is incremented by one. Next, at 164, it is determined if integer k is greater than or equal to integer L (e.g., without limitation, four; any suitable integer greater than one). If not, then step 158 is repeated.

Otherwise, if the test, at 164, is true, then, at 168, the LOADBANK ENABLE signal 34 is set false, integer k is reset to zero, and the timer is reset to zero. Then, at 170, the logical VALID INPUT SIGNAL is set to one. This value can also be output to output 38. Then, at 172, the routine 150 delays for a period T3 (e.g., without limitation, 2000 mS; any suitable time, which is greater than both T1 and T2 of step 178), after which step 153 is repeated.

Otherwise, if the timer test, at 158, is true, then, at 174, the LOADBANK ENABLE signal 34 is set false, integer k is reset to zero, and the timer is reset to zero. Then, at 176, the logical VALID INPUT SIGNAL is set to zero. This value can also be output to output 38. Then, at 178, the routine 150 delays for a period T2 (e.g., without limitation, 750 mS; any suitable time, which is greater than T1 and less than T3), after which step 153 is repeated.

Steps 158,160,162,164 determine if the signal 28 was true for at least L consecutive times during the first predetermined time, T1, responsively set the true state of the logical VALID INPUT SIGNAL, and delay for the third predetermined time, T3. Otherwise, steps 158,174,176,178 delay for the second predetermined time, T2, if the signal 28 was not valid (e.g., without limitation, three or less rising edges occurred) during the first predetermined time, T1.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. An input circuit for an alternating current signal from a pair of elongated conductors, said input circuit comprising:
   an interface structured to output a first signal from the alternating current signal of said pair of elongated conductors;
   a load switchable to said pair of elongated conductors; and
   a processor structured to:
   (i) output a second signal to switch said load to said pair of elongated conductors asynchronously with respect to said alternating current signal for a first predetermined time,
   (ii) input the first signal,
   (iii) determine if the input first signal is active a plurality of times during the first predetermined time and responsively set a first state of said alternating current signal, and, otherwise, set an opposite second state of said alternating current signal, and
   (iv) delay for a second predetermined time, which is longer than the first predetermined time, for the opposite second state before repeating said output, and, otherwise, delay for a third predetermined time, which is longer than the second predetermined time, for the first state before repeating said output.

2. The input circuit of claim 1 wherein said first predetermined time is about 121 mS, said second predetermined time is about 750 mS, and said third predetermined time is about 2000 mS.

3. The input circuit of claim 1 wherein said first predetermined time corresponds to at least four consecutive zero-crossings during at least four consecutive alternating current line cycles of the alternating current signal.

4. The input circuit of claim 1 wherein said interface comprises a half-wave rectifier and a linear regulator powered by said half-wave rectifier and being structured to output a signal including a positive direct current voltage when a positive half of the half-wave rectified alternating current signal is present, and about zero volts when a negative half of the half-wave rectified alternating current signal is present.

5. The input circuit of claim 4 wherein said interface further comprises a divider circuit structured to divide the signal of said linear regulator and output said first signal; and wherein said processor comprises an input structured to input the first signal.

6. The input circuit of claim 4 wherein said interface further comprises a peak hold circuit powered by said square wave and structured to power said processor.

7. The input circuit of claim 6 wherein said peak hold circuit is structured to output a direct current voltage.

8. The input circuit of claim 1 wherein said alternating current signal is from one of a 50 Hz and a 60 Hz alternating current power source.

9. The input circuit of claim 1 wherein one of said pair of elongated conductors is electrically connected to an alternating current power source proximate to said interface; wherein the other one of said pair of elongated conductors is electrically connected to said interface; and wherein said pair of elongated conductors extends for a distance of about 100 feet to about two miles and is remotely electrically connected to a remote switch.

10. The input circuit of claim 1 wherein said processor is structured to determine if the first signal is active for a plurality of consecutive times during the first predetermined time, responsively set the first state of said alternating current signal, and delay for the third predetermined time, and, otherwise, delay for the second predetermined time.

11. A motor starter comprising:
   a contactor; and
   an overload relay comprising:
      an input for an alternating current signal from a pair of elongated conductors,
      an interface structured to output a first signal from the alternating current signal of said pair of elongated conductors,
      a load switchable to said pair of elongated conductors, and
      a processor structured to:
         (i) output a second signal to switch said load to said pair of elongated conductors asynchronously with respect to said alternating current signal for a first predetermined time,
         (ii) input the first signal,
         (iii) determine if the input first signal is active a plurality of times during the first predetermined time and responsively set a first state of said alternating current signal, and, otherwise, set an opposite second state of said alternating current signal, and
         (iv) delay for a second predetermined time, which is longer than the first predetermined time, for the opposite second state before repeating said output, and, otherwise, delay for a third predetermined time, which is longer than the second predetermined time, for the first state before repeating said output.

12. The motor starter of claim 11 wherein said alternating current signal is a reset signal.

13. The motor starter of claim 11 wherein said alternating current signal is a permissive signal.

14. The motor starter of claim 11 wherein said alternating current signal is a start signal.

15. The motor starter of claim 11 wherein said processor is structured to determine if the first signal is active for a plurality of consecutive times during the first predetermined time, responsively set the first state of said alternating current signal, and delay for the third predetermined time, and, otherwise, delay for the second predetermined time.

16. The motor starter of claim 11 wherein one of said pair of elongated conductors is electrically connected to an alternating current power source proximate to said interface; wherein the other one of said pair of elongated conductors is electrically connected to said interface; and wherein said pair of elongated conductors extends for a distance of about 100 feet to about two miles and is remotely electrically connected to a remote switch.

17. The motor starter of claim 11 wherein said interface comprises a half-wave rectifier and a linear regulator powered by said half-wave rectifier and being structured to output a signal including a positive direct current voltage when a positive half of the half-wave rectified alternating current signal is present, and about zero volts when a negative half of the half-wave rectified alternating current signal is present.

18. The motor starter of claim 17 wherein said interface further comprises a divider circuit structured to divide the signal of said linear regulator and output said first signal; and wherein said processor comprises an input structured to input the first signal.

19. The motor starter of claim 17 wherein said interface further comprises a peak hold circuit powered by the signal of said linear regulator and structured to power said processor.

20. The motor starter of claim 19 wherein said peak hold circuit is structured to output a direct current voltage.

21. An input circuit for an alternating current signal from a pair of elongated conductors which extend for a distance of about 100 feet to about two miles and are electrically connected to a remote switch, said input circuit comprising:
   an interface distal from the remote switch and structured to output a signal from the alternating current signal of said pair of elongated conductors;
   a processor structured to input the output signal and responsively set a first state or an opposite second state of the alternating current signal; and
   a load switchable by said processor to said pair of elongated conductors,
   wherein a first conductor of said pair of elongated conductors is electrically connected to an alternating current power source proximate to said interface,
   wherein a second conductor of said pair of elongated conductors is electrically connected to said interface, and
   wherein said processor is further structured to allow said first and second conductors to extend for said distance without being affected by capacitive coupling of a voltage to said second conductor.

22. An input circuit for an alternating current signal from a pair of elongated conductors, said input circuit comprising:
   an interface structured to output a first signal from the alternating current signal of said pair of elongated conductors;
   a load switchable to said pair of elongated conductors; and
   a processor structured to:
      (i) switch said load to said pair of elongated conductors asynchronously with respect to said alternating current signal for a first predetermined time,
      (ii) input the first signal,
      (iii) determine if the input first signal is active a plurality of times during the first predetermined time and responsively set a first state of said alternating current signal, and, otherwise, set an opposite second state of said alternating current signal, and
      (iv) delay for a second predetermined time, which is longer than the first predetermined time, for the opposite second state before repeating said switch said load, and, otherwise, delay for a third predetermined time, which is longer than the second predetermined time, for the first state before repeating said switch said load.

* * * * *